(12) United States Patent
Shahar et al.

(10) Patent No.: US 7,479,639 B1
(45) Date of Patent: Jan. 20, 2009

(54) APPARATUS, METHOD AND SYSTEM FOR DETERMINING ENERGY WINDOWS IN MEDICAL-IMAGING SYSTEMS

(75) Inventors: Arie Shahar, Moshave Magshimim (IL); Uri El-Hanany, Rehovot (IL)

(73) Assignee: Orbotech Medical Solutions Ltd., Rehovot (IL)

( * ) Notice: Subject to any disclaimer, the term of this patent is extended or adjusted under 35 U.S.C. 154(b) by 22 days.

(21) Appl. No.: 11/847,359

(22) Filed: Aug. 30, 2007

(51) Int. Cl.
*G01T 1/24* (2006.01)
(52) U.S. Cl. .................................. 250/370.06
(58) Field of Classification Search ................................
250/370.01–370.15
See application file for complete search history.

(56) References Cited

U.S. PATENT DOCUMENTS 6,541,763 B2  4/2003  Lingren et al.

OTHER PUBLICATIONS

Wells et al., "Optimal Energy Window Selection for Scintigraphy & Emission Computed Tomography," 2005 IEEE, Nuclear Science Symposium Conference Record, pp.2049-2053.*

* cited by examiner

*Primary Examiner*—David P Porta
*Assistant Examiner*—Kiho Kim
(74) *Attorney, Agent, or Firm*—EMPK & Shiloh, LLP

(57) ABSTRACT

System and method for determining an energy window in a medical imaging system. The imaging system, designed to operate in a single photon counting mode, includes a pixilated radiation detector having an array of detector elements coupled to respective electronic channels. The method includes measuring the electronic signals produced for each detector element and producing two spectra corresponding to two different energy levels of photons, deriving an electrical offset for the signals received from each detector element and producing corrected signals and a corrected spectrum of radiation flux impinging on the detector, calculating a peak channel value measured in units of energy channels, and determining an energy window for each detector element such that the width of the window is equal to a desired fraction of the peak channel value.

20 Claims, 4 Drawing Sheets

APPARATUS, METHOD AND SYSTEM FOR DETERMINING ENERGY WINDOWS IN MEDICAL-IMAGING SYSTEMS

FIELD

Embodiments of the invention relate to the field of medical imaging and in particular to medical-imaging systems using a single photon counting technique.

BACKGROUND

In the field of nuclear medicine, an image is produced either by radioisotopes that are absorbed within the patient organs and that emit gamma radiation therefrom, or by X-ray radiation that is produced by an X-ray source that transmits its radiation via the patient body. In X-ray and gamma ray imaging systems that operate at a high-energy spectrum (short wavelengths), such as the systems used for medical imaging, an imaging component, such as a lens, is not available. Thus a collimator is used to acquire the image.

Gamma rays emitted from the patient organs or X-ray radiation that passes through the patient's body suffer from a scattering effect known as Compton scattering. The scattered radiation causes image distortions and appears as background noise in the acquired image.

Accordingly, it is highly important to discriminate the scattered radiation and not use it for image reconstruction. There is a correlation between the scattering angle of the radiation scattered by Compton scattering and the energy loss of the scattered photons in this radiation: The larger the scattering angle of the radiation scattered by Compton scattering, the greater the energy loss of the scattered photons. The original energy of the photons is a known value determined by the type of the radioisotopes that produces the photons. Accordingly, using only photons that did not suffer energy loss, or which suffered relatively low energy loss, in comparison to their original energy for the image reconstruction may assure that the image is constructed with no or very little distortion from scattered photons.

Measuring the photons' energy may be done by the well-known technique of single photon counting. In a single photon counting technique, a radiation detector measures the radiation photon-by-photon, when for each photon its energy is measured. A histogram, known as a spectrum, is built by the computer of the imaging system and presents the number of photons versus their energy. The energy span is divided into discrete values of energy ranges known as energy channels.

Two very common types of single photon counting radiation detectors are indirect conversion and direct conversion radiation detectors. The indirect conversion detector is based on a combination of a scintillator (such as NaI scintllator) with photomultipliers. The direct conversion detector is a semiconductor detector such as CdZnTe (CZT).

The energy resolution of the detector is a critical parameter in rejecting the scattered photons: The higher the energy resolution of the detector, the higher the detector efficiency. The efficiency of the detector goes up with its energy resolution since the number of photons (out of the number of photons impinging on the detector) that appear in a relatively narrow energy window around the energy of the photon emitted by the radioisotope and used for the image reconstruction increases with the energy-resolution of the detector.

The photons that are used for the image reconstruction are the photons with measured energy that falls in the energy range (the width of the energy window) around the energy of the spectrum peak (peak channel) corresponding to the energy of the radioisotope as measured by the detector. The peak channel is the energy channel with a value equal to that of the channel for which the spectrum has a maximum of counts or events. The energy is measured in units of energy channels that are proportional to the energy in KeV units. Usually, the width of the energy window is determined by the imaging system as a fraction or percentage of the energy of the radioisotope energy. However, the position of the peak channel of the radioisotope on the energy axis, as measured by the detector, may be affected by the following parameters:

1. The total gain of the system, consisting of the product of the electronic gain of the system and the detector gain; and
2. The system offset, usually caused by the offset of the electronic unit of the system when the detector does not contribute to the offset.

Due to the electronic offset mentioned above, the energy position of the measured peak-channel of the spectrum is not necessarily proportional to the energy of the radioisotope. Thus the width of the energy window used for the imaging cannot be derived only from the peak position of the spectrum.

In addition, the radiation detector used in single photon counting is typically a pixilated detector where each of the pixels of the detector is connected to a different electronic amplification channel. Thus, each of the detector pixels may measure the position of the energy peak at a different energy since it may have a different gain that is further amplified and shifted by the different gain and offset of the respective electronic channel.

SUMMARY

Some embodiments of the invention provide a medical imaging system and method that provides an energy window for each of the detector pixels which is a desired fraction of the peak energy of the spectrum of the pixel, when this fraction is the same for all the detector pixels.

Some embodiments of the invention provide a calibration method for medical imaging systems that is robust and substantially insensitive to gain drifts of the medical imaging system. Embodiments of the invention may provide other and/or additional benefits and/or advantages.

In some embodiments, the medical imaging system includes a pixilated radiation detector having multiple pixels, and an electronic system having multiple electronic channels designed to operate in a single photon counting mode. Each of the multiple pixels is connected to one of the electronic channels, for producing electronic signals to indicate detection of a photon by the detector in one of the pixels. The detector may be a semiconductor detector, for example, made of CdZnTe.

The imaging system may include an offset compensation unit, such as a dummy electronic channel. The dummy electronic channel may be separated from the pixilated detector and may have an output that is connected to an input of a comparator of the electronic system, for example a negative input of the comparator.

In some embodiments, a method for determining energy windows includes measuring the electronic signals produced for each pixel, for example, using a multi-channel analyzer, to produce for each pixel two spectra corresponding to two different energies of photons in radiation flux impinging on the detector. The two spectra may be produced by two different isotopes or by one isotope emitting photons having two different energies.

According to the method, the two spectra are used to derive an electrical offset for the signals received from each pixel, which is then used to apply an offset correction and produce corrected signals. The corrected signals are used to produce a corrected spectrum of radiation flux impinging on the detector, for example, using the multi-channel analyzer. A peak channel of the corrected spectrum (which is one of possibly multiple energy channels of the corrected spectrum having a maximum number of counts) is derived, and the value of the peak channel, as measured in units of energy channels, is obtained.

Finally, the method includes determining an energy window for each pixel such that the width of the window is equal to a set fraction of the peak channel value. The energy window may be centered symmetrically on the peak channel or positioned asymmetrically around the peak channel.

Some embodiments include an apparatus for determining energy windows in an imaging system having a single photon counting mode. For example, the apparatus may include a pixilated radiation detector having an array of detector elements such that each of the detector elements is coupled to a respective electronic channel and wherein detection of a photon at one of the detector elements produces a signal carried by the respective electronic channel; a multi-channel analyzer to measure the signals carried by the channels and to generate two respective spectra for each of the detector elements such that the two spectra correspond to two respective energy levels of photons in radiation flux impinging on the detector; a correction unit to correct the signals for each of the detector elements by applying an electrical offset correction derived from the two respective spectra, and to determine a corrected spectrum of radiation flux for each of the detector elements based on the respective corrected signals; and an energy window determiner to determine, for each of the detector elements, a peak channel of the respective corrected spectrum having a highest number of counts, and to determine an energy window in the respective corrected spectrum having a width equal to a desired fraction of the width of the peak channel.

Some embodiments include a method for determining energy windows in an imaging system having a single photon counting mode. For example, the method may include measuring detection signals carried on electronic channels that are respectively coupled to an array of detector elements of a pixilated detector, wherein detection of a photon at one of said detector elements produces a signal carried by the respective electronic channel; generating two respective spectra for each of the detector elements, based on the signals produced for said detector elements and carried on the channels, the two respective spectra corresponding to two respective energy levels of photons in radiation flux impinging on the detector; deriving a respective electrical offset for each of the detector elements, based on the two respective spectra, and correcting the signals produced for each of the detector elements by applying the respective electrical offset; constructing a corrected spectrum of radiation flux for each of the detector elements, based on the respective corrected signals; determining for each of the detector elements a peak channel of the respective corrected spectrum, the peak channel having a maximum of counts; and determining for each of the detector elements an energy window in the respective corrected spectrum, the energy window having a width equal to a desired fraction of the width of said peak channel.

Some embodiments include an imaging system having a single photon counting mode. For example, the system may include an apparatus for determining energy windows; and a display device to display a reconstructed image having pixels corresponding to the array of detector elements such that each pixel of the reconstructed image is based a total number of counts within the energy window determined for the respective corrected spectrum of the corresponding detector element.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Further, reference numerals may be repeated among the figures to indicate corresponding or analogous elements. Moreover, some of the blocks depicted in the drawings may be combined into a single function. The figures are listed below.

DETAILED DESCRIPTION

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion. It is intended that the embodiments and figures disclosed herein be considered illustrative rather than restrictive.

Portions of the discussion herein utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used herein to describe two or more items; for example, a plurality of items includes two or more items.

Figure 1:
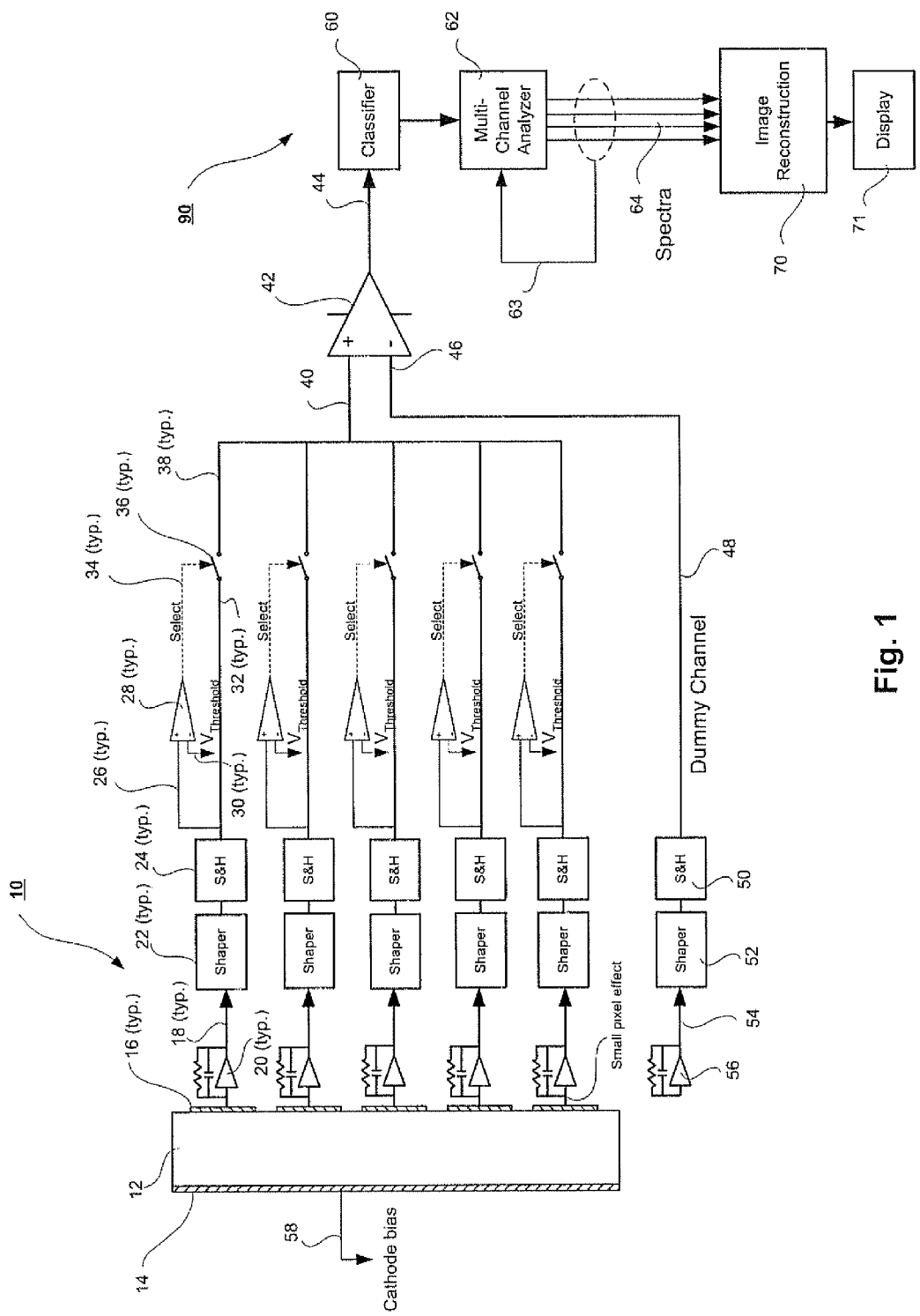
FIG. 1 is a schematic illustration of a radiation detector having pixels connected to electronic channels having a compensation mechanism to compensate for offset variations and drifts, in accordance with some embodiments of the present invention.

FIG. 1 schematically illustrates a system 10 that includes a radiation detector 12, which may be a semiconductor radiation detector. The semiconductor from which the detector is made may be, for example, CdZnTe (CZT), Silicon (Si), or Germanium (Ge). System 10 may be used as part of a medical imaging system in accordance with some embodiments of the invention. In addition, the medical imaging system may include a computing system 90 operationally associated with the radiation detection system 10 and including suitable hardware components and/or software components to provide the functionality described herein.

In some embodiments, detector 12 has a plurality of pixilated anodes 16 (typ.) and a monolithic cathode 14 that is biased by a High Voltage (HV) cathode bias 58. Each of anodes 16 is connected to an electronic channel 18 (typ.). Electronic channels 18 include charge sensitive pre-amplifiers 20 (typ.), shapers 22 (typ.), Sample & Hold (S&H) units 24 (typ.), terminals 26 (typ.) and 32 (typ.), comparators 28 (typ.) having inputs 26 (typ.) and 30 (typ.) and output 34 (typ.), switches 36 (typ.) and output terminals 38 (typ.).

All output ports 38 of electronic channels 18 are connected to a first input 40 of an operational amplifier 42 having an output 44. A second input 46 of operational amplifier 42 is connected to an output 48 of a dummy channel 54. Dummy channel 54 includes a charge sensitive pre-amplifier 56, a shaper 52 and a S&H unit 50, which are similar to pre-amplifiers 20, shapers 22, and S&H units 24 of channels 18.

When a photon is absorbed in a voxel (volumetric pixel) in detector 12, it creates a charge of electrons and holes that drift toward the corresponding anode 16 and cathode 14 of this voxel, respectively. The motion of the charge carriers induces current into pre-amplifier 20. Pre-amplifier 20 integrates this current to produce a signal that is filtered by shaper 22 and is stored by S&H unit 24. The signal stored at S&H unit 24 appears at positive input 26 of comparator 28. If this signal is higher than the reference voltage $V_{threshold}$ at negative input 30 of comparator 28, then comparator 28 generates a signal (select signal) at its output 34, which closes switch 36 to transmit the signal from S&H unit 24 to input 40 of operational amplifier 42. Operational amplifier 42 is a volt-to-current converter that converts the voltage signal from S&H module 24 to a current signal at output 44 of amplifier 42.

In some embodiments, computing system 90 may include modules such as a classifier unit, a Multi Channels Analyzer (MCA), a correction unit, an energy window determiner, an image reconstruction unit, and a display unit. The various functions of components of system 90, as described herein, may be implemented in one or more multi-function hardware and/or software components.

For example, a classifier unit 60 may classify the signals at output 44 according to the positions (addresses) of the pixels (detector elements) from which this signal arrives A Multi Channels Analyzer (MCA) 62 may arrange the events arriving from each of the pixels in the form of a histogram 64 that shows the number of events (counts) measured versus their energy. This histogram is also known as the spectrum of the measured pixel. Spectra 64 may undergo a correction and/or calibration (63) in accordance with embodiments of the invention as described herein, for example, to determine energy windows. For example, a correction unit may be used to correct the spectra and an energy window determiner may be used to determine the energy windows. The corrected spectra may be used for image reconstruction (70) and displayed on a display unit 71. For example, the histogram spectrum for each detector element may be converted to a gray-scale image on the display 71 according to the detected photons that fall within the energy window.

In accordance with some embodiments, the signal from S&H unit 24 at terminal 38 depends on the gain and offset of electronic channels 18 and the gain of detector 12. Detector 12 does not contribute to the offset since its leakage current is compensated by a current compensation unit (not shown). Dummy channel 54 is similar to channels 18 and its output 48 is connected to negative input 46 of operational amplifier 42. Dummy channel 54 is not connected to detector 12 and does not receive any signal from this detector. Thus the signal that dummy channel 54 produces at negative input 46 of amplifier 42 is due to offset only. Accordingly, dummy channel 54 subtracts its offset from the similar offset of channels 18 and operate as an offset compensation unit to compensate the offset drifts and variations of channels 18 for making system 10 substantially independent of offset variations and drifts.

However, while dummy channel 54 may compensate for offset variations to make system 10 independent on offset variations and drifts, system 10 is still affected by gain variations of detector 12 and channels 18. In accordance with some embodiments, the method of determining energy windows may provide a calibration for system 10 that is substantially insensitive to gain drifts.

Figure 2:
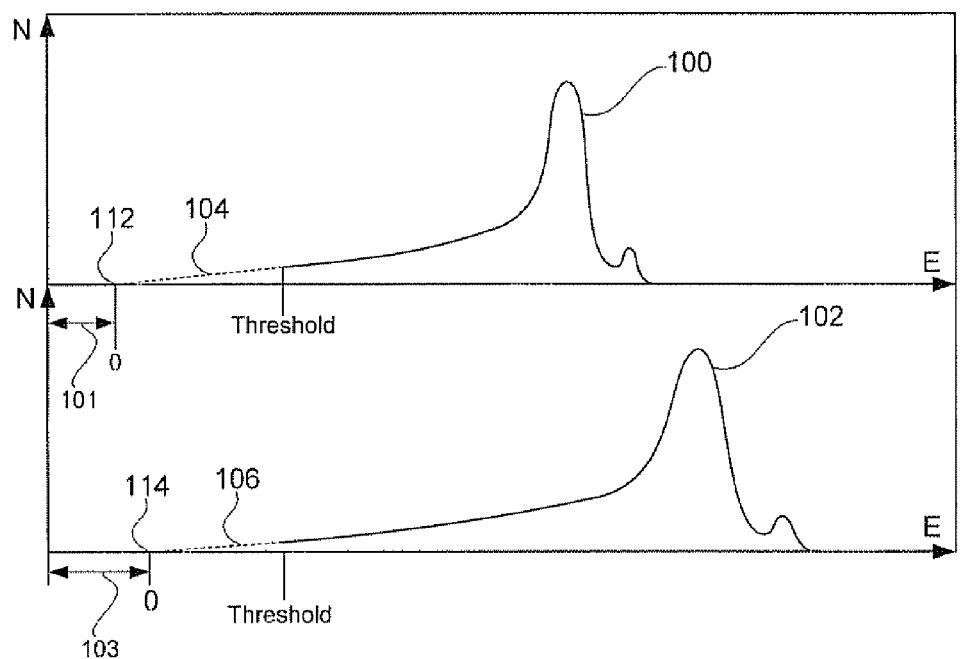
FIG. 2 schematically illustrates the spectra received from two different electronic channels connected to two different pixels of a radiation detector in accordance with some embodiments of the present invention.

FIG. 2 illustrates as an example two spectra 100 and 102 of two different pixels 16. The spectra show the number of events (along axis N) versus the event energy (along axis E). The spectra (solid lines) start above the energy corresponding to the threshold level of comparator 28 of FIG. 1. Broken lines 104 and 106, related to energies below the threshold level, are the extrapolations of spectra 100 and 102, respectively. Points 112 and 114, where broken lines 104 and 106 intersect with the energy axes E, are the real zero energy of spectra 100 and 102, respectively. The energy range between the origins of spectra 100 and 102 and points 112 and 114 are the energy offsets 101 and 103 of spectra 100 and 102, respectively.

In this example, it can be seen that energy offset 103 of spectrum 102 is greater than energy offset 101 of spectrum 100. It is also noticeable that spectrum 102 is more "stretched" horizontally than spectrum 100 due to the higher energy gain of spectrum 102.

One method of correcting the spectra involves normalizing the energy positions of the energy peaks measured by the different pixels of the detector. The normalization may be performed for each individual pixel. This method will be referred to herein as the "normalization" method and is illustrated, for example, in FIG. 5b below.

In the normalization method, the value of the peak channel in the pixel spectrum of the corresponding pixel is multiplied by a normalization factor to align all the peak channels of all the spectra of the pixels to the same energy channel. The width of the energy window (measured by energy channels) in which the energy of the photons used for imaging falls may be determined by the imaging system to be the same for all of the detector pixels.

However, the normalization method of aligning all of the peak channels of the detector pixels does not take into account the offset of the electronic channels of the detector pixels. This means that even though that all the peak channels of the different pixels of the detector are aligned to the same energy channel, they are still not aligned to the same energy since each of the peak channels may have a different offset (shift). Thus the proportional factor between the peak channel and its energy may be different for each pixel. This means that when applying the same width of energy window for all the spectra of the different pixels, the fraction of the width of the energy window out of the energy peak is different for each pixel and may not be as desired.

To overcome the above-mentioned drawback of the normalization method, a calibration method may be used to calibrate the spectra of the different pixels. This method will be referred to herein as the "calibration" method and is illustrated, for example, in FIG. 5c below.

In the calibration method, the spectra of the pixels are measured with two radioisotopes having known energies. The value of the peak channels of these isotopes is measured by the pixels of the detector. This means that for each of the pixels there are two equations and two unknowns:

$$(\text{Channel}_{peak1} \cdot \text{Gain}_i) + \text{Offset}_i = \text{Energy}_{isotop1} \qquad \text{Eq. (1)}$$

$$(\text{Channel}_{peak2} \cdot \text{Gain}_i) + \text{Offset}_i = \text{Energy}_{isotop2} \qquad \text{Eq. (2)}$$

In the above equations, $\text{Channel}_{peak1}$ is the energy channel of the peak in the spectrum of isotope 1 as measured by pixel i, $\text{Gain}_i$ is the gain for pixel i, $\text{Offset}_i$ is the offset of pixel i, and $\text{Energy}_{isotop1}$ is the energy of isotope 1. Similarly, $\text{Channel}_{peak2}$ is the energy channel of the peak in the spectrum of isotope 2 as measured by pixel i, and $\text{Energy}_{isotop2}$ is the energy of isotope 2. The two unknowns, $\text{Gain}_i$ and $\text{Offset}_i$, may be derived from Eqs. (1) and (2) above for aligning all the peak channels to the same energy.

In the calibration method, unlike the situation that exists in the normalization method, the offset of the electronic channels is taken into account and thus the energies of the peaks in the spectra of all the pixels are proportional to the common peak channel to which all the peak energies are aligned. The same width of energy window is applied for all the spectra of the different pixels. All the photons with energy that falls in this window are used for the image reconstruction. Unlike the situation in the normalization method, in the calibration method the fraction of the width of the energy window out of the energy peak is the same for each of the detector pixels, as desired.

However, the problem with the above-described calibration method is that it relies on the value of the gain, $\text{Gain}_i$. The gain is sensitive to environmental drifts and its value is drifted as well. Thus the imaging system should be calibrated periodically as described above. The calibration of the system requires the use of high intensity sources that may not be allowed in some sites where the imaging system is located. In addition, the calibration of the system is time consuming and may cause too long a downtime of an expensive imaging system.

Figure 3:
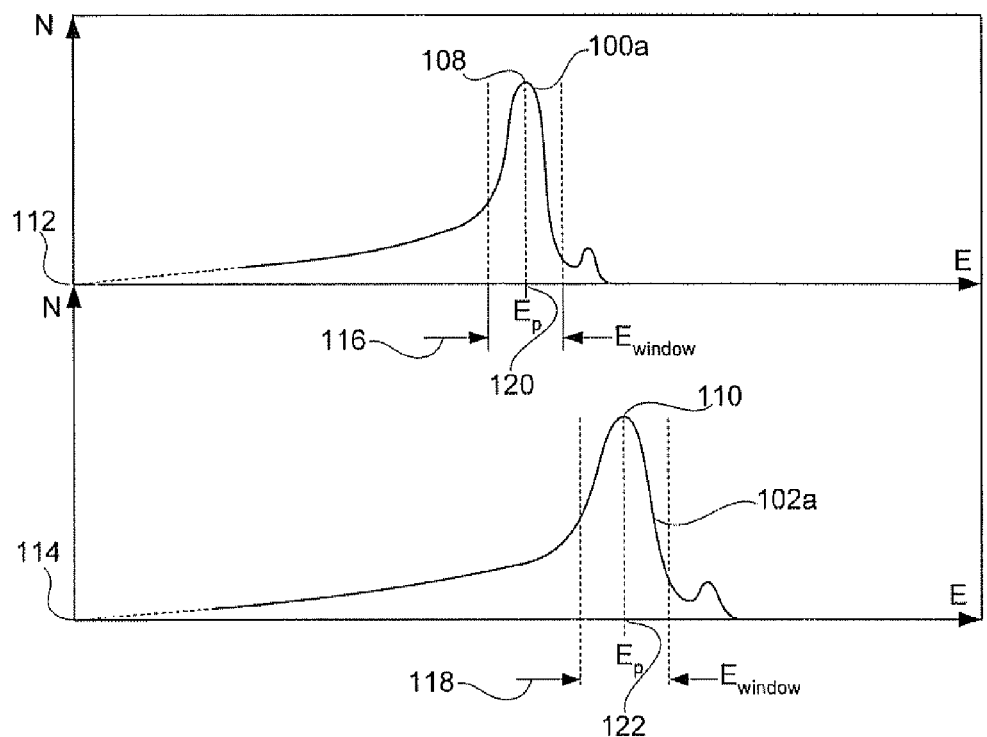
FIG. 3 schematically illustrates the spectra of FIG. 2 with offset correction in accordance with some embodiments of the present invention.

FIG. 3 illustrates spectra 100*a* and 102*a*, which are spectra 100 and 102 of FIG. 2 after correction of offsets 101 and 103 in accordance with some embodiments of the invention. For example, the offsets may be corrected by shifting spectra 100 and 102 such that respective zero energy points 112 and 114 of FIG. 2 coincide with the origin of energy axes E of FIG. 3.

Similar reference numerals are used for spectra 100 and 102 of FIG. 2 and spectra 100*a* and 102*a* of FIG. 3, since spectra 100*a* and 102*a* of FIG. 3 are only shifted with respect to spectra 100 and 102 of FIG. 2. The zero points on energy axis E have the same referral numerals 112 and 114 in FIGS. 2 and 3. Spectra 100*a* and 102*a* have not been corrected for gain calibration and their energy peaks 108 and 110 are located at different energy channels 120 and 122 on the energy axes E, respectively. The energy channels are discrete energy intervals. The value of the energy channels is proportional to the energy levels of the photons measured by the radiation detector, such as detector 12 of FIG. 1.

Offsets 101 and 103 of spectra 100 and 102, respectively, may be derived in a way similar to that of the calibration method described above, for example, by using results acquired with two different radioisotopes and calculating according to Eqs. (1) and (2). The energy windows 116 and 118 of respective spectra 100*a* and 102*a* may be determined as a fraction of the energy of peaks 108 and 110 located on energy channels 120 and 122, respectively.

Although energy window 118 of spectrum 102*a* appears wider than window 116 of spectrum 100*a*, they represent the same fraction of the energy of peaks 108 and 110, respectively. The reason for the different widow widths of spectra 100*a* and 102*a* is the non-calibrated energy gain that leaves the energy gain of spectrum 102*a* to be greater than the energy gain of spectrum 100*a*.

For the same reason as the different energy gains in spectra 100*a* and 102*a*, the energy of peaks 108 and 110, which represent the same energy level of the measured radioisotope, appear in different positions at energy channels 120 and 122 on the energy axes.

The following is an example of calculating the energy window in accordance with some embodiments of the invention:

After the offset correction as shown in FIG. 3, peak channels 120 and 122 are located at energy channels of the above mentioned MCA, having, for example, values of 65 and 82. If, for example, the measured spectra 100*a* and 102*a* are of the radioisotope Co57, then channel 65 of spectrum 100*a* and channel 85 of spectrum 102*a* both represent of the spectrum peak (corresponding to the peak channel), then the energy window of spectrum 100*a* is given by:

$$\Delta E = 65 \text{ channels} \cdot 10\% = 6.5 \text{ channels} = 122 \text{ Kev} \cdot 10\% = 12.2 \text{ KeV} \qquad \text{Eq. (3)}$$

Similarly, for the same energy window of 10% of the peak energy, the energy window of spectrum 102 is given by:

$$\Delta E = 82 \text{ channels} \cdot 10\% = 8.2 \text{ channels} = 122 \text{ Kev} \cdot 10\% = 12.2 \text{ KeV} \qquad \text{Eq. (4)}$$

Accordingly, it is clear that while the energy window is 12.2 Kev for both spectrum 100*a* and spectrum 102*a*, the window width, measured by energy channels, is different for the two spectra and is equal to 6.6 and 8.2 channels for spectra 100 and 102, respectively.

It should be understood that the energy window may be located either symmetrically or asymmetrically around the peak channel.

Figure 4:
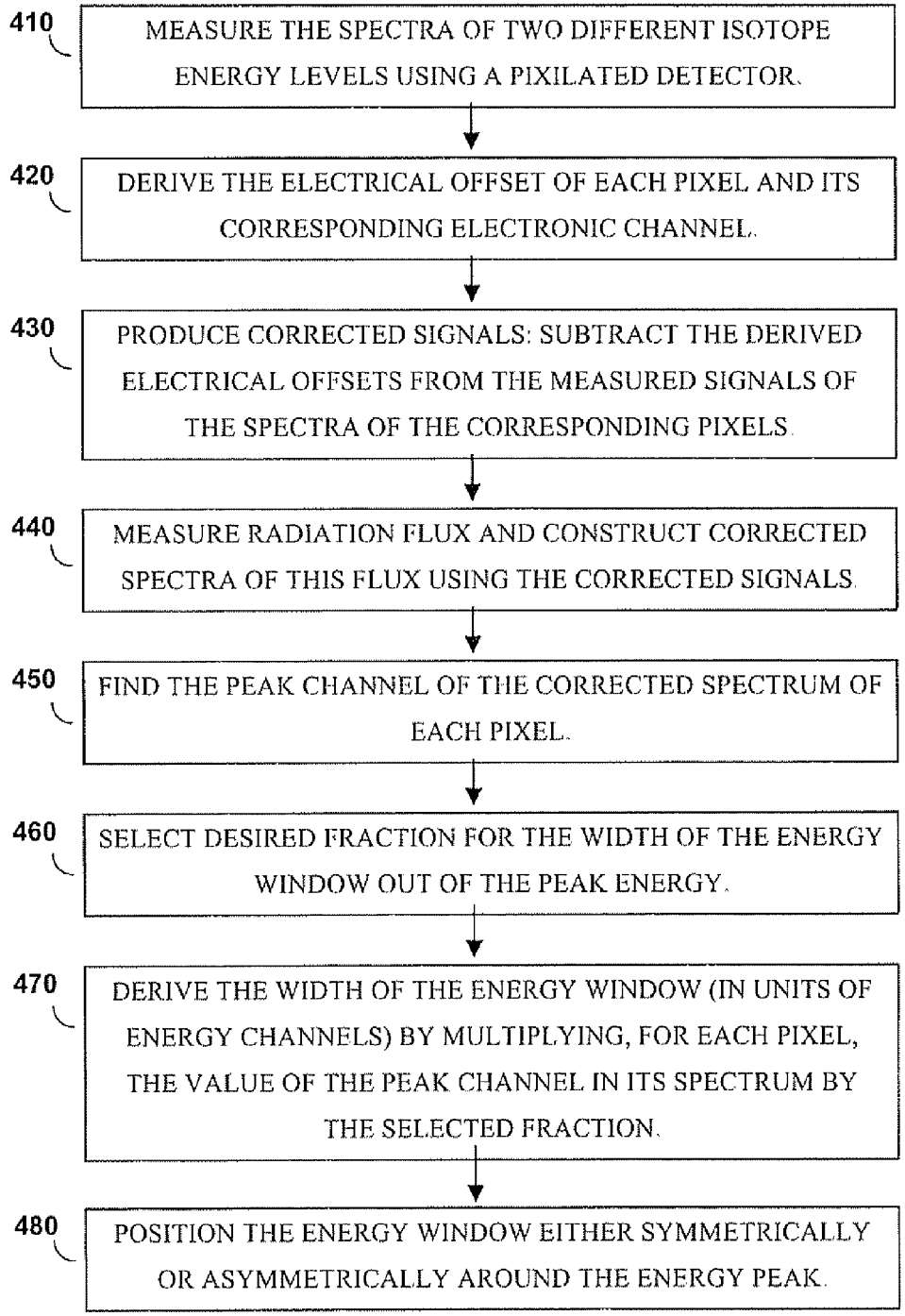
FIG. 4 is a schematic flow-chart of the method of determining energy windows in accordance with some embodiments of the present invention.

In general, the method for determining energy windows in accordance with embodiments of the invention includes the following, for example, as illustrated at FIG. 4:

(Block 410) Measuring the spectra of two different isotopes or radioisotopes using a pixilated detector.

(Block 420) Deriving the electrical offset of each pixel and its corresponding electronic channel using Eqs. (1) and (2).

(Block 430) Subtracting the derived electrical offsets from the measured signals of the spectra of the corresponding pixels for producing corrected signals.

(Block 440) Measuring radiation flux and constructing a corrected spectrum of this flux using the corrected signals.

(Block 450) Deriving the peak channel of the corrected spectrum of each pixel. The peak channel is an energy channel for which the spectrum has a highest number of counts/events.

(Block 460) Selecting the desired fraction of the width of the energy window out of the peak energy.

(Block 470) Deriving the width of the energy window (in units of energy channels) by multiplying, for each pixel, the value of the peak channel in its spectrum by the chosen fraction of clause 6.

(Block 480) Positioning the energy window either symmetrically or asymmetrically around the energy peak.

From the above, it is clear that the method according to embodiments of the present invention is sensitive only to the offsets of the pixels and is insensitive both to the gain of the detector and to the gain of the electronic channels connected to the detector pixels.

Thus it is clear that when the pixilated detector and the electronic channels connected to its array of detector elements are insensitive to drifts and variations of their offsets, as it is in system 10 of FIG. 1, the method according to embodiments of the present invention is very robust and should not have to be recalibrated or should be calibrated very rarely. In any case, the frequency in which an imaging system should be readjusted according to the present method is much lower than that required from the normalization and calibration methods mentioned above.

Figure 5A:
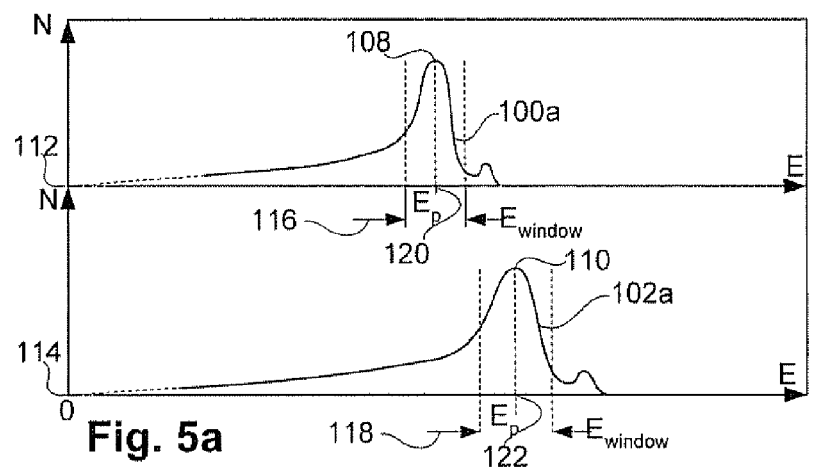
FIGS. 5*a*, 5*b*, and 5*c* schematically illustrate the spectra of FIG. 2 as corrected according to the method of the present invention, as normalized by the normalization method, and as calibrated by the calibration method, respectively.
Figure 5B:
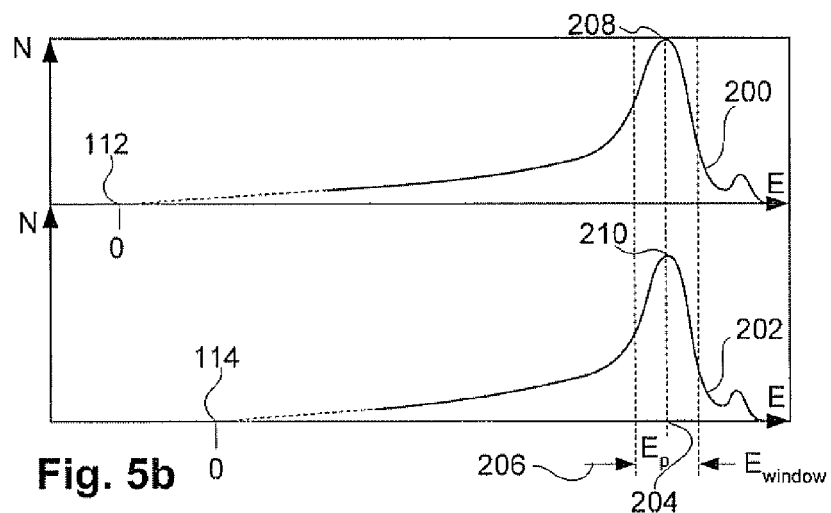
Figure 5C:
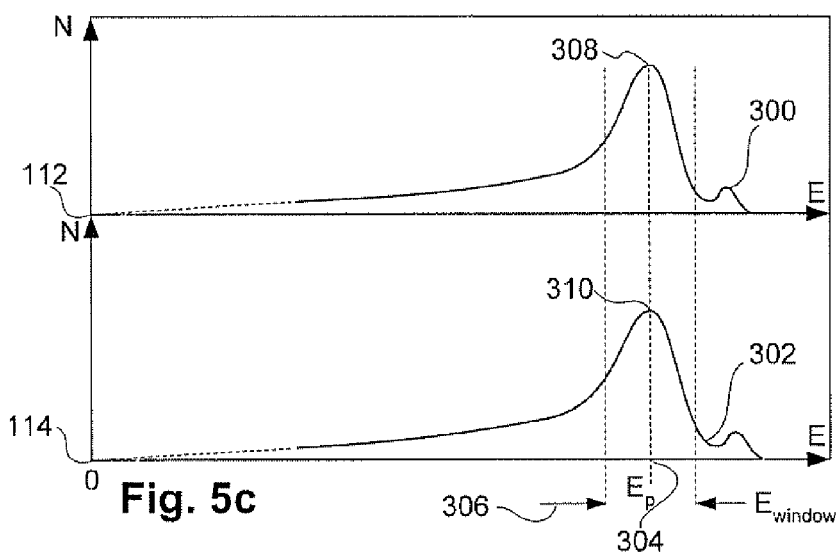

FIGS. 5*a*, 5*b*, and 5*c* are schematic illustrations of the conversions of spectra 100 and 102 of FIG. 2 as being performed by the method according to embodiments of the present invention, the normalization method, and the calibration method, respectively.

FIG. 5*a* is similar to FIG. 3, showing the conversion of spectra 100 and 102 of FIG. 2 into spectra 100*a* and 102*a* according to an embodiment of the present invention. FIG. 5*a* is shown again as a version of FIG. 3 in the set of drawings 5*a*, 5*b* and 5*c* to ease the comparison between the different methods. However the above description for FIG. 3 will not be repeated here.

FIG. 5*b* is a schematic illustration of the conversion of spectra 100 and 102 of FIG. 2 into spectra 200 and 202 according to the normalization method mentioned above. According to this method, the offset of spectra 100 and 102 is not corrected. Thus points 112 and 114 representing the zero energy points of spectra 200 and 202 are not coinciding with the origin of energy axes E. The conversion according to the normalization method is performed only by gain normalization for aligning spectra peaks 208 and 210 to the same energy channels 204. This alignment is done by multiplying the values of the energy channels of spectra 100 and 102 by factors that will align peaks 208 and 210 with same energy channel 204. The gain normalization (stretching) of spectrum 100 for obtaining spectrum 200 of FIG. 5*b* is done by multiplying the values of the energy channels of spectrum 100 by a factor of 1.46. Similarly, the gain normalization of spectrum 102 for obtaining spectrum 202 of FIG. 5*b* is done by multiplying the values of the energy channels of spectrum 102 by a factor of 1.0.

Spectra 200 and 202 have the same width of energy window 206 measured by units of energy channels. However, energy window 206 of spectra 200 and 202 does not represent the same energy fraction out of the energy peaks 208 and 210.

Accordingly, as explained previously, the normalization method has the disadvantage of providing, for each spectrum, an energy window with an energy width that represents a different fraction of the energy of the spectrum peak. In addition, the normalization method strongly depends on the gain of the imaging system and thus should be recalibrated frequently.

FIG. 5*c* schematically illustrates the conversion of spectra 100 and 102 of FIG. 2 into spectra 300 and 302 according to the calibration method mentioned above. According to this method, the offset of spectra 100 and 102 is corrected. Thus points 112 and 114 representing the zero energy points of spectra 300 and 302 coincide with the origin of energy axes E. The conversion according to the calibration method is performed by both gain and offset calibration for aligning spectra peaks 308 and 310 to the same energy channels 304. This alignment is done by deriving the gain and offset calibration values from Eqs. (1) and (2).

The offset correction is done by spectra shifts and the gain calibrations are performed by multiplying the values of the energy channels of spectra 100 and 102 by the gain calibration factor (stretching). The calibration aligns peaks 308 and 310 with same energy channel 304. According to this calibration, spectra peaks 308 and 310 are aligned with energy channel 304 which, unlike the situation that exists with the normalization method, represents the same energy for peaks 308 and 310.

Spectra 300 and 302 have the same width of energy window 306 measured by units of energy channels. Energy window 306 of spectra 300 and 302 does represent the same energy fraction out of the energy peaks 308 and 310.

Accordingly, as explained previously, the calibration method has the disadvantage of being strongly dependent on the gain of the imaging system and thus should be frequently recalibrated.

The method according to embodiments of the present invention, unlike the normalization and calibration methods, does not align all the spectra peaks with the same energy channel and does not necessarily have the same energy window for each spectrum when measured in units of energy channels. The method according to embodiments of the present invention may determine for each of the spectra an energy window that is different for each spectrum when measured in units of energy channels. However, unlike the situation that exists with the normalization method, the energy window for each channel represents a predetermined fraction of the energy of the peak channel that is the same for all the spectra, as desired.

In addition, the method according to embodiments of the present invention, unlike the situation that exists in the normalization and calibration methods, is independent of the gain of the imaging system and thus insensitive to this gain. Thus when a method according to embodiments of the present invention is applied to an imaging system, such as an imaging system that includes the radiation detection system of FIG. 1, it is also insensitive to offset drifts and variations.

This makes the method according to embodiments of the present invention insensitive to both gain variations and drifts and to offset variations and drifts of the imaging system. Accordingly, when using the combination of the system of FIG. 1 with the method according to embodiments of the present invention, the imaging system is very robust and there may be no need for readjustment or, unlike the situation with the normalization and calibration methods, the readjustment should be performed very rarely.

While certain features of the invention have been illustrated and described herein, many modifications, substitutions, changes, and equivalents may occur to those skilled in the art: While some coincidence gates are illustrated as receiving a signal at their inputs from a single source, they may receive the signals from different sources. While some of the method steps are described or illustrated as using the measurements of two isotopes, embodiments can include measuring one isotope having an emission of at least two energy lines. While the explanatory steps of the present method are described with reference to an energy window having a width that is equal to 10% of the energy of the spectrum peak, the width of this window may be at any desired fraction of this energy.

It is, therefore, to be understood that the appended claims are intended to cover all such modifications and changes as fall within the true spirit of the invention. The scope of the present invention should be determined by the appended claims and their legal equivalents, and not by the examples given.

It will be evident to those skilled in the art that embodiments of the invention are not limited to the details of the foregoing illustrative examples and drawings, and that an apparatus, method, and/or system according to embodiments of the invention may be utilized in other specific forms without departing from the spirit or the essential attributes thereof.

The embodiments of the invention described herein are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for determining energy windows in an imaging system having a single photon counting mode, the apparatus comprising:
   a pixilated radiation detector having an array of detector elements, each of said detector elements coupled to a respective electronic channel, wherein detection of a photon at one of said detector elements produces a signal carried by the respective electronic channel;
   a multi-channel analyzer to measure the signals carried by said channels and to generate two respective spectra for each of said detector elements, said spectra corresponding to two respective energy levels of photons in radiation flux impinging on the detector;
   a correction unit to correct the signals for each of said detector elements by applying an electrical offset correction derived from the two respective spectra, and to determine a corrected spectrum of radiation flux for each of said detector elements, based on respective corrected signals; and
   an energy window determiner to determine, for each of said detector elements, a peak channel of the respective corrected spectrum, said peak channel having a highest number of counts, and to determine an energy window in the respective corrected spectrum, said energy window having a width equal to a desired fraction of the width of said peak channel.

2. The apparatus of claim 1, wherein said pixilated radiation detector is made of a semiconductor detector.

3. The apparatus of claim 2, wherein said semiconductor detector is made of CdZnTe.

4. The apparatus of claim 1, comprising an offset compensation unit to compensate for offset variations of said electronic channels.

5. The apparatus of claim 4, wherein said offset compensation unit comprises a dummy electronic channel.

6. The apparatus of claim 5, wherein said dummy electronic channel is separated from said pixilated detector.

7. The apparatus of claim 6, wherein said dummy electronic channel has an output connected to an input of a comparator coupled to said electronic channels.

8. The apparatus of claim 7, wherein said input is a negative input of said comparator.

9. The apparatus of claim 1, wherein the energy window determiner is to center the energy window around said peak channel.

10. The apparatus of claim 1, wherein the energy window determiner is to position the energy window asymmetrically around said peak channel.

11. A method for determining energy windows in an imaging system having a single photon counting mode, the method comprising:
    measuring detection signals carried on electronic channels that are respectively coupled to an array of detector elements of a pixilated detector, wherein detection of a photon at one of said detector elements produces a signal carried by the respective electronic channel;
    generating two respective spectra for each of said detector elements, based on the signals produced for said detector elements and carried on said channels, said two respective spectra corresponding to two respective energy levels of photons in radiation flux impinging on the detector;
    deriving a respective electrical offset for each of said detector elements, based on the two respective spectra, and correcting the signals produced for each of said detector elements by applying said respective electrical offset;
    constructing a corrected spectrum of radiation flux for each of said detector elements, based on respective corrected signals;
    determining for each of the detector elements a peak channel of the respective corrected spectrum, said peak channel having a maximum of counts; and
    determining for each of the detector elements an energy window in the respective corrected spectrum, said energy window having a width equal to a desired fraction of the width of said peak channel.

12. The method of claim 11, wherein said two spectra are produced by two isotopes emitting photons having two different energy levels.

13. The method of claim 11, wherein said two spectra are produced by one isotope emitting elements having two different energy levels.

14. The method of claim 11, wherein determining an energy window comprises:
    selecting a desired fraction of the width of said peak channel; and
    for each of said detector elements, multiplying, in the respective corrected spectrum, the value of the peak channel by said desired fraction..

15. The method of claim 11, comprising centering the energy window around said peak channel.

16. The method of claim 11, comprising positioning the energy window asymmetrically around said peak channel.

17. The method of claim 11, wherein said energy window is measured in units of energy channels, by width.

18. The method of claim 11, comprising compensating for offset variations of said electronic channels.

19. The method of claim 11, wherein the pixilated radiation detector is a semiconductor detector made of CdZnTe.

20. An imaging system having a single photon counting mode, the system comprising:
    a pixilated radiation detector having an array of detector elements, each of said detector elements coupled to a respective electronic channel, wherein detection of a photon at one of said detector elements produces a signal carried by the respective electronic channel;
    a multi-channel analyzer to measure the signals carried by said channels and to generate two respective spectra for each of said detector elements, said spectra corresponding to two respective energy levels of photons in radiation flux impinging on the detector;
    a correction unit to correct the signals for each of said detector elements by applying an electrical offset correction derived from the two respective spectra, and to determine a corrected spectrum of radiation flux for each of said detector elements, based on respective corrected signals;
    an energy window determiner to determine, for each of said detector elements, a peak channel of the respective corrected spectrum, said peak channel having a highest number of counts, and to determine an energy window in the respective corrected spectrum, said energy window having a width equal to a desired fraction of the width of said peak channel; and
    a display to display a reconstructed image having pixels corresponding to said array of detector elements, wherein each pixel of the reconstructed image is based a total number of counts within the energy window determined for the respective corrected spectrum of the corresponding detector element.

* * * * *